United States Patent [19]

Acosta

[11] 4,248,714
[45] Feb. 3, 1981

[54] FILTER

[76] Inventor: William A. Acosta, 4101 Laurel Dr., Lafayette Hill, Pa. 19444

[21] Appl. No.: 961,593

[22] Filed: Nov. 17, 1978

[51] Int. Cl.³ .................... B01D 29/24; B01D 29/32
[52] U.S. Cl. .................... 210/238; 210/440; 210/450; 210/451; 220/327; 210/323.2
[58] Field of Search .............. 210/232, 237, 238, 249, 210/323 R, 323 T, 440, 443–445, 450, 451, 477; 220/327, 328, 336

[56] References Cited

U.S. PATENT DOCUMENTS

| | | | |
|---|---|---|---|
| 420,136 | 1/1890 | Willis | 210/323 T |
| 511,756 | 1/1894 | Criqui | 210/238 |
| 648,043 | 4/1900 | Miles | 210/323 T X |
| 1,013,761 | 1/1912 | Gavelack | 210/327 X |
| 1,051,530 | 1/1913 | Whalen | 220/327 X |
| 2,357,943 | 9/1944 | Feagley et al. | 210/249 X |
| 2,409,518 | 10/1946 | Smith et al. | 220/327 X |
| 2,550,493 | 4/1951 | Ohlson | 220/327 |
| 2,828,863 | 4/1958 | Van Lier et al. | 210/323 T X |
| 2,872,043 | 2/1959 | Fitzgerald et al. | 210/323 T X |
| 2,889,933 | 6/1959 | Brundage | 210/323 T X |
| 2,921,686 | 1/1960 | Forman et al. | 210/323 T |
| 3,017,032 | 1/1964 | Urdanoff | 210/323 T X |
| 3,454,184 | 7/1969 | Halpin | 220/327 |
| 3,720,322 | 3/1973 | Harms | 210/238 |
| 4,057,502 | 11/1977 | Crumrine et al. | 210/450 X |

*Primary Examiner*—Robert H. Spitzer
*Attorney, Agent, or Firm*—Caesar, Rivise, Bernstein & Cohen, Ltd.

[57] ABSTRACT

A filter system comprising a tank and a filter assembly removably mounted therein. The filter assembly includes a plurality of filter tubes in fluid communication with a plenum chamber on the bottom thereof. The plenum chamber is open on its bottom, and rests on the bottom of the filter tank. Suitable seals maintain the fluid integrity of the plenum chamber against the bottom of the tank. The filtrate leaves the plenum chamber through an outlet port in the bottom of the tank.

The inlet port is also in the bottom of the tank, and the fluid to be filtered passes upwardly through a channel formed in the center of the plenum chamber. The top of the tank is sealed by a U-shaped gasket, with the cover of the tank resting on the gasket. No auxiliary flanges are needed to provide a top seal. The cover of the tank is raised by a lifting mechanism, and is rotatable away from the top of the tank to permit access to the tank. When the cover is to be returned to its closing position, a keying mechanism automatically seats the cover in the proper position.

43 Claims, 7 Drawing Figures

FILTER

This invention relates to a novel filter system, and more particularly, to a filter system that includes a filter tank, a removable filter assembly, a novel seal at the top of the tank and a novel mechanism for removing the cover of the tank and automatically reseating the cover in its proper position.

When filtering certain fluids which may have an adverse effect on the material from which the filter tank is made, it is a common practice to coat the interior of the filter tank and all incoming and outgoing lines. The coating process is necessary when filtering sea water. Thus, the sea water will corrode a metal tank, and accordingly the metal tank and the other elements of the filter must be given a protective coating, such as an epoxy resin or other corrosion resistant lining. The same problem also arises when filtering various chemical solutions.

In one filter system currently in use, the tube sheet is removable from the filter tank in order to permit the coating of the tank. When doing this, flanges and gaskets must be provided at the bottom of the tank to permit the removal of the tube sheet so that the plenum chamber below the tube sheet can be coated. Having a filter tank and tube sheet which must be taken apart in this manner greatly adds to the cost of manufacture and to the cost of metal used in the filter tank.

One partial solution to the problem has been to provide a removable cover for the plenum chamber to provide a manway access opening. The problem with this is that there is still an additional cost in providing a fluid-tight cover for the manway access opening. Furthermore, even with the access opening, it is extremely difficult for a man to enter the plenum chamber and properly coat the interior thereof. The manway access opening cannot be used on smaller filter tanks, since there is not enough room for the man to enter the opening and conduct the coating process.

In one aspect of this invention, the entire filter assembly is removable from the tank so that the tank and the filter assembly can be completely coated. This is accomplishable by providing a filter assembly having an integral plenum chamber for the filtrate, and automatically-sealing gaskets at the bottom of the plenum chamber.

Having this structure permits complete welding, grinding of the welds and preparation of the tank and filter assembly prior to coating. Unless these process steps can be accomplished, the coating is worthless.

Additionally, having the totally removable filter assembly, including the plenum chamber, facilitates the cleaning of the filter assembly, the changing of filter tubes and the cleaning of the tank with a minimum of down time. This is particularly important in the filtration of foods or potable liquids, where total cleanliness at all times is mandatory.

In another aspect of this invention, a novel seal is provided between the top of the filter tank and the cover for the tank. Various gasketing arrangements have been used in the past, all of which have been found to be quite costly relative to the cost of the gasketing arrangement of this invention. Thus, in the filter systems presently in use, generally flanges are provided around the circumference or perimeter of the upper edge of the filter tank. The cover also includes a flange which overlies the tank flange. The gasketing is normally accomplished by grooving either the flange on the tank and/or the flange in the cover and utilizing flat rubber gaskets within the groove or O-rings. Even where flat ring type gaskets are used without grooving, there is still a substantial amount of excess metal and labor needed to provide the flanges for receiving the gasket.

In this aspect of the invention, the use of a flange on the tank is totally eliminated. Instead, a U-shaped gasket is provided which rests on the upper edge of the tank. A flat cover plate merely rests on the flange, and after the cover plate is tightened in place, a fluid-tight seal is effected.

In order to prevent an excess of seal-loading pressure on the U-shaped gasket, limiting means are provided when tightening the cover. These limiting means will ensure that the cover will be sufficiently tight to maintain pressure within the vessel and to prevent any fluid leakage, while at the same time preventing the over-tightening of the cover to the extent that it might shear the gasket at the top of the tank.

In still a further aspect of this invention, a novel lifting means is provided for removing the cover from the tank. The lifting means comprises a screwjack mounted on the side of the tank. After the cover is raised to a sufficient height, it can be rotated 180° about its axis, thereby providing a totally open top on the tank and complete access to its interior. After the tank is cleaned or serviced, the cover is manually rotated back to its original position, and the screwjack is lowered. A key arrangement automatically seats the cover in its proper orientation position. The location of the screwjack mechanism permits its operation from grade level, thus affording greater operator safety.

In the past, various lifting means have been provided for removing covers from a filter tank. Among these lifting means was a hand-wheel screw, a hydraulic mechanism, a cam mechanism or an electric winch. All of these mechanisms are quite costly, are more difficult to install and they do not automatically seat the cover in its proper position when returning the cover to the tank. Most of them require operation from above the tank. All of these problems are overcome by the lifting mechanism on the tank of the instant invention.

It is accordingly an object of this invention to provide a novel filter.

It is another object of this invention to provide a novel filter assembly for use in a filter tank and system.

It is a further object of this invention to provide a novel gasket assembly for a filter tank.

It is yet a further object of this invention to provide a novel lifting assembly for removing a cover from and replacing a cover on a filter tank.

These and other objects of this invention are accomplished by providing a filter comprising a tank and a filter assembly removably mounted in said tank, said filter assembly comprising a tube sheet, a plurality of filter tubes secured in said tube sheet, said tube sheet having a peripheral skirt projecting downwardly therefrom, and gasket means on said peripheral skirt, said gasket means being in contact with the bottom of said filter tank, whereby a plenum chamber is formed by said tube sheet, peripheral skirt and tank bottom, and outlet means in fluid communication with said plenum chamber.

Other objects and many of the attendant advantages of this invention will be readily appreciated as the same becomes better understood by reference to the following detailed description when considered in connection with the accompanying drawings wherein.

Figure 1:
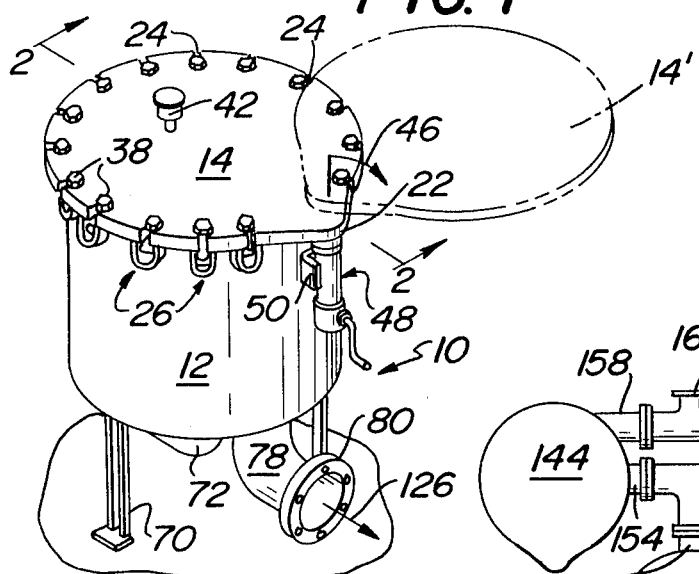
FIG. 1 is a perspective view of a filter embodying the present invention.

Referring now in greater detail to the various figures of the drawings wherein like reference characters refer to like parts, a filter embodying the present invention is generally shown at 10 in FIG. 1. Device 10 basically comprises a tank 12 having a cover 14 and a filter assembly 16 mounted in the tank.

Figure 2:
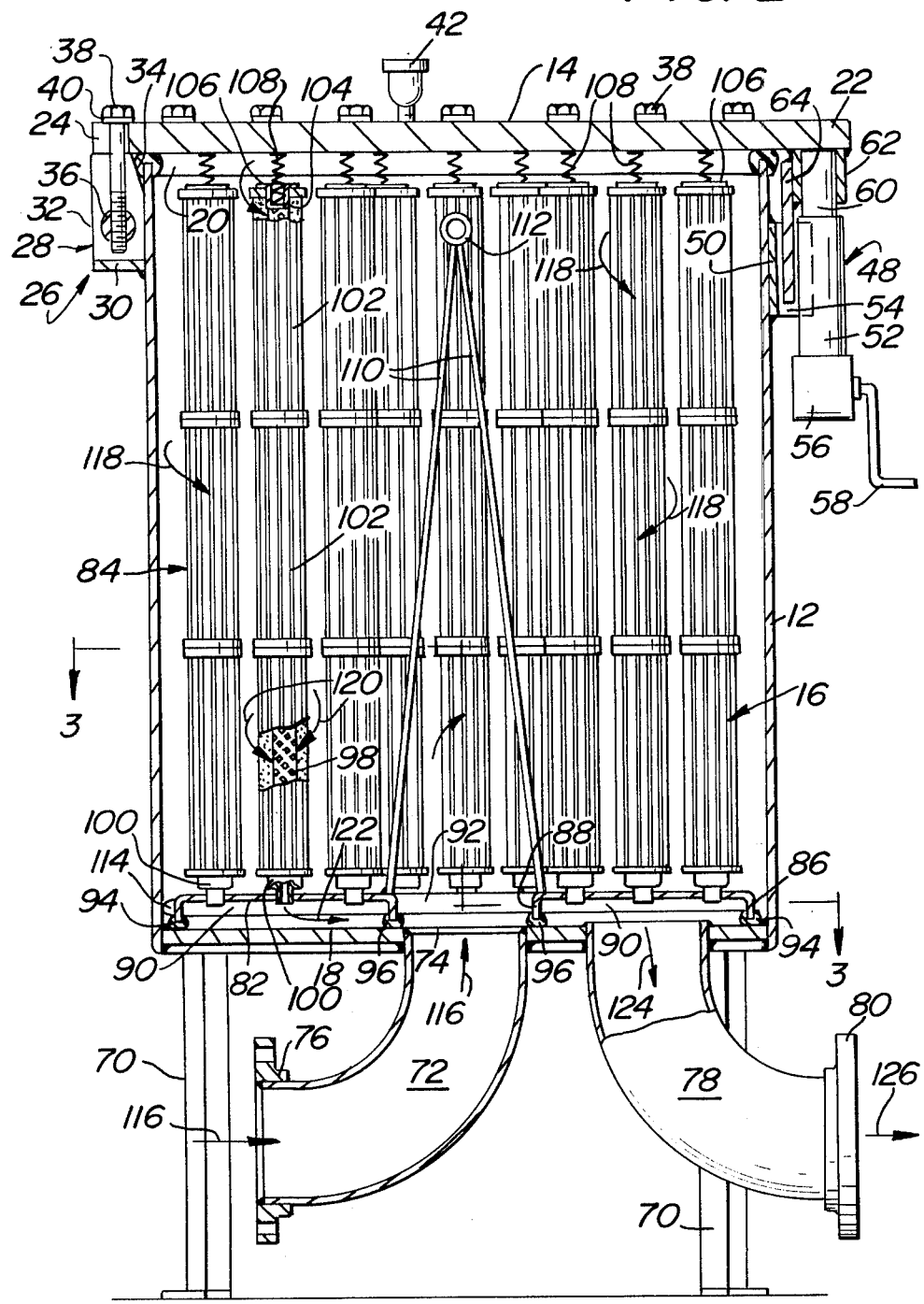
FIG. 2 is an enlarged sectional view taken along the line 2—2 of FIG. 1.

Tank 12 is cylindrical, and has a bottom 18 welded in place (FIG. 2). The upper edge of the tank has secured thereon a U-shaped gasket 20. Gasket 20 is formed from rubber, either natural or synthetic, or may be any of the plastics conventionally used for gasketing materials. It can be formed by a conventional extruding process, and after it is cut to size, the ends are abutted and glued. Thereafter, it is snapped over the upper edge of the tank.

In forming the gasket, the legs of the U can be angled slightly toward each other. Accordingly, when the gasket is slid over the upper edge of the tank, the legs will resiliently and frictionally grip the upper edge of the tank, and remain securely in place.

As seen in FIG. 1, the cover 14 is basically a circular plate, and has an extending lip 22. The diameter of cover 14 is slightly greater than the diameter of tank 12. The cover has a plurality of inwardly projecting slots 24 around the circumference thereof (FIG. 1). Mounted in each slot is a bolt assembly 26, the purpose of which is to secure the cover 14 in place.

Figure 4:
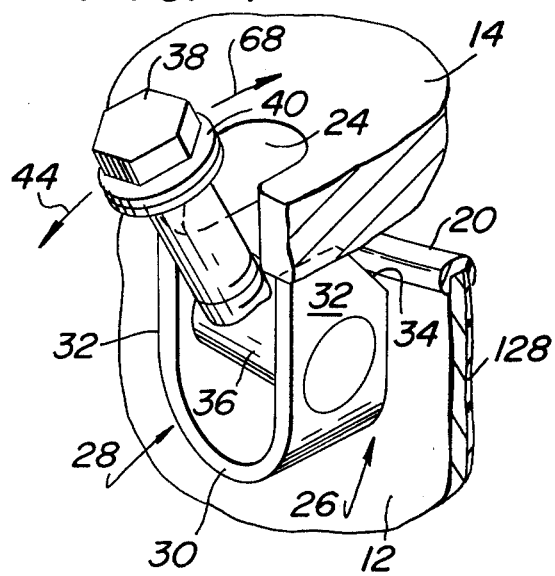
FIG. 4 is a perspective view of a bolt assembly used for securing the cover of the filter tank in place.

Referring to FIGS. 2 and 4, it is seen that each bolt assembly 26 comprises a U-shaped bracket 28, which is welded to the outside of tank 12. Bracket 28 includes base 30 and upstanding legs 32. Each leg 32 includes a bevelled edge 34, in order to accommodate the U-shaped gasket 20. A rod 36 is horizontally and rotatably mounted in legs 32. Rod 36 has a vertically extending, internally threaded hole passing therethrough, and in which a bolt 38 is threadedly received. Washers 40 are associated with the bolt 38.

With the cover 14 in the position shown in full line in FIG. 1 and in FIG. 2, it provides a pressure-tight and fluid-tight seal with tank 12, through the use of gasket 20. Since the fluid passing through the filter 10 may be under pressure, a conventional pressure-relief valve 42 is placed in cover 14, and is in fluid communication with the interior of the tank 12. The cover is held in place by the tightening of the bolts 38 in rods 36. In order to ensure the exact amount of tightening necessary, the bolts 38 are tightened until the cover abuts the upper edges of legs 32 of U-shaped brackets 28 (FIG. 2). At this point, the U-shaped gasket 20 is sufficiently compressed to make a pressure-tight and fluid-tight seal. However, the pressure is not so great that it will shear the gasket against the upper edge of the tank 12. Without the limiting effect of the upper edges of the legs 32, which act as stops, it would be possible to tighten the bolt so greatly that the gasket will be sheared.

When it is desired to enter the interior of tank 12, as for cleaning the tank or for replacing the filters therein, bolts 38 are first loosened by threadedly rotating them partially out of rods 36. After they have been loosened, they are rotated from slot 24 (FIG. 4) in the direction of arrow 44. This is easily accomplished, since the rods 36 are rotatable in legs 32. After all of the bolts 38 have been rotated out of contact with the cover 14, the cover 14 can be rotated 180° from the position shown in FIG. 2, in order to completely expose the interior of tank 12. The direction of rotation is shown by arrow 46 in FIG. 1, and the cover during rotation is shown in phantom at 14' in FIG. 1.

Prior to rotating the cover 14, it must first be lifted off tank 12. In order to accomplish the lifting, a lifting mechanism 48 is provided. The lifting mechanism 48 includes a conventional screwjack, the details of which are well known to the art. The lifting mechanism is secured on tank 12 through the use of a U-shaped bracket 50, which is welded on the exterior of tank 12. A cylinder 52 is welded between the legs of bracket 50, in such a way as to leave a gap 54 between the base of the bracket and the wall of cylinder 52. Mounted on the base of cylinder 52 is a gear housing 56. A crank 58 is rotatably mounted within the gear housing 56. When the crank 58 is rotated, it in turn rotates a bevel gear, which in turn rotates a second bevel gear formed at the bottom of a vertically extending screw. The vertically extending screw is threadedly received in an internally threaded cylinder 60 (FIG. 2). Accordingly, the rotation of crank 58 will ultimately cause cylinder 60 to rise or lower, depending on the direction of rotation of crank 58, in the normal manner of a screwjack. Cylinder 60 has an external diameter which is slightly less than the internal diameter of cylinder 52, and accordingly cylinder 52 provides a guide for maintaining the vertical movement of cylinder 60.

Figure 5:
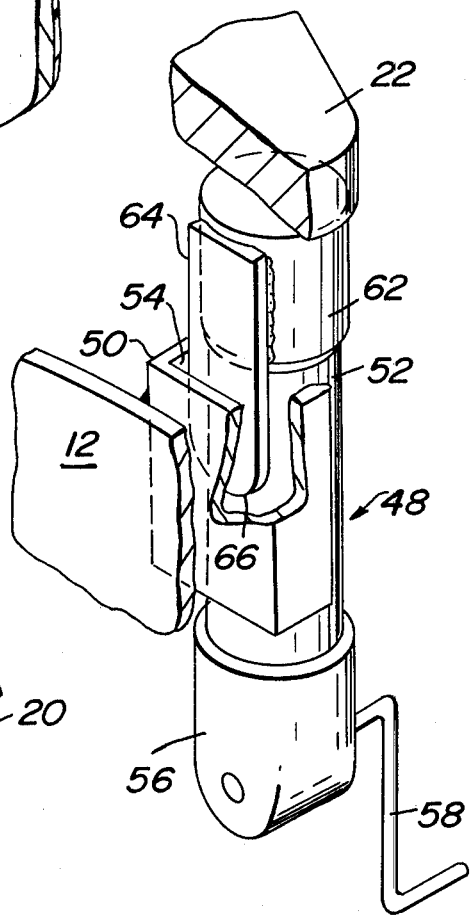
FIG. 5 is a perspective view, partially broken away, showing the lifting and reseating mechanism for the cover of the filter tank of this invention.

A sleeve 62 (FIGS. 2 and 5) is welded to the bottom of lip 22 of cover 14, and is freely rotatable about cylinder 60. A bar or key 64 is welded to sleeve 62, and is received in gap 54. With the bar 64 in gap 54, the cover 14 is properly aligned with tank 12, so that bolts 38 can easily be pivoted into or out of slots 24.

When it is desired to move the cover 14 from the position shown in FIGS. 1 and 2, the crank 58 is rotated in a clockwise direction. This will cause cylinder 60 to rise, which in turn will raise cover 14. Vertical upward movement is ensured because of the close fit between cylinder 60 and cylinder 52, and between sleeve 62 and cylinder 60. The raising of cylinder 60 is continued until the lower edge of bar 64 is above the upper edge of bracket 50, and thus above the gap 54. When this position is reached, the cover 14 is easily rotated by hand in the direction of arrow 46 (FIG. 1) until the cover is rotated 180° from the position shown in FIGS. 1 and 2. At this point, the entire top of tank 12 is exposed, and any necessary cleaning of the tank or removal of the filter assembly 16 can be accomplished.

After the necessary work has been completed within the interior of the tank 12, the cover is again rotated back to the position where it overlies the tank. Thereafter, the crank 58 is rotated in the opposite direction to lower cylinder 60. During the lowering process, the bar 64 is aligned with the gap 54, and will automatically enter the gap. To facilitate this, the bar 64 has a rounded lower edge 66 (FIG. 5) which cams the bar into the gap 54. Once the bar 64 has entered the gap 54, the cover 14 will automatically be seated in its proper location when the cylinder 60 is completely lowered. Since the cylinder 60 is unconnected to the cover 14 or the sleeve 62, it can be lowered to the extent that it will vertically slide downward relative to the cover and sleeve. This will permit the complete tightening of the cover 14 in place, without interference from the cylinder 60.

Once the cover has been fully lowered in place and cylinder 60 has been removed from contact with the cover, all of the bolts 38 are swung upwardly in the direction of arrow 68 (FIG. 4) and into their associated slots 24. The bolts 38 are then tightened in the manner described above, and the filter system is again ready for use.

One of the features of the clamping mechanism for the top of the tank is the ease in which the clamping mechanism can be secured in place. Thus, during the assembly process, all of the bolts 38 wll be slid in their associated slots 24, with the associated brackets 28 hanging loosely from the bolt shanks. The bolts will be sufficiently tightened in rods 36 to cause the upper edges of the brackets 28 to abut the underside of the cover 14, as shown in FIG. 2. The desired force for the cover 14 can then be applied to the cover, in the form of weights. This will compress the gasket 20 to the desired condition. At this point, each of the brackets 28 is manually held against the side of the tank 12, and welded in place. After all of the brackets are welded in place, the weight can be removed from the cover 14, and the bolt assemblies will then be ready for use.

Carrying out the foregoing procedure will always ensure that the bolts will be properly tightened after the opening and reclosing of the top of the filter tank.

The filter tank can be supported by any of the means known to the art. By way of example, legs 70 are provided. Centrally located in the bottom plate 18 of the tank in an inlet opening for fluid to be filtered. Welded within this opening is a pipe 72 having a bevelled fillet weld 74, to facilitate fluid flow. The other end of pipe 72 includes a conventional flange 76 for connection with another pipe, which will bring the fluid to be filtered to the tank 12.

A second opening is formed in bottom 18, and a pipe 78 is welded therein. Pipe 78 is used for the removal of the filtrate. A conventional flange 80 is mounted on the end of the pipe 78.

Figure 3:
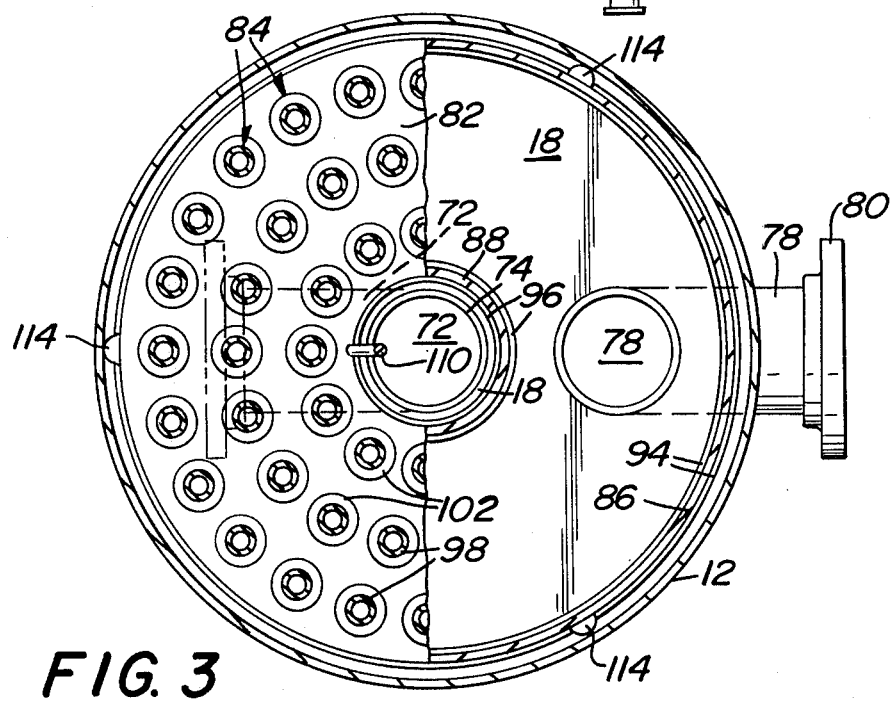
FIG. 3 is a sectional view taken along the line 3—3 of FIG. 2.

Referring to FIGS. 2 and 3, it is seen that the filter assembly 16 comprises a tube sheet 82 having a plurality of filter elements 84 secured therein and projecting upwardly therefrom. The tube sheet includes an outer peripheral dependent skirt 86 and an inner dependent skirt 88. Skirts 86 and 88 are unitary with tube sheet 82 and join with the tube sheet to form an annular plenum chamber 90. Thus, dependent skirts 86 and 88 are concentric rings, with the diameter of skirt 86 being slightly less than the internal diameter of tank 12, and the diameter of dependent skirt 88 being slightly greater than the diameter of inlet pipe 72 and its associated opening. Accordingly, as seen in FIG. 2, a circular opening 92 is formed by skirt 88 in tube sheet 82, which opening surrounds the top of pipe 72.

A U-shaped gasket 94 is secured on the lower edge of skirt 86, and a U-shaped gasket 96 is secured on the lower edge of skirt 88. The gaskets 94 and 96 are identical in structure and material to gasket 20 at the top of tank 12. The gaskets are snapped over the skirts 86 and 88, and are resiliently and frictionally held in place. If desired, they can be adhesively secured.

Referring to FIG. 2, it is seen that there are a plurality of filter elements secured in the tube sheet 82. Each filter element includes a rigid, perforated core 98. Core 98 is a conventional filter element cartridge tube or core, and can be made of any of the materials conventionally used for such cores, such as nylon, polyvinyl chloride or stainless steel. The bottom of the core is capped with a filter element centering post, which centering post has a hollow bore in fluid communication with the interior of core 98. The centering post can also be made of the same materials as the core 98. A plurality of replaceable filter cartridges 102 are stacked on the centering post 100 and around the core 98. In the embodiment shown, the cartridges are formed from pleated paper. However, it should be understood that any of the replaceable cartridges known to the art can be used in carrying out this invention, such as paper, cellular or fabric filters. The fabric filters can also include filtering medium therein, such as fuller's earth. A socket 104 having an annular flange 106 is placed in the opening in the top cartridge 102, with the flange resting on the cartridge. A compression spring 108 is placed in each socket 104. The springs 108 are compressed by the cover 14.

The springs 108 and their associated sockets 104 serve three functions in the filter system of this invention. One function is to seal the tops of filter elements 102 in order to ensure that no unfiltered fluid passes into the cores 98. Additionally, the flanges 106 serve to compress the filter cartridges 102 in order to ensure that no fluid passes between a pair of adjacent stacked cartridges or between the lowermost filter element and the centering post 100. Lastly, the springs bring pressure to bear upon the tube sheet 82 and its associated skirts 86 and 88. This in turn forms a fluid-tight seal between the gaskets 94 and 96 and the tank bottom 18. In this way, the plenum chamber 90 will be fluid-tight.

As will be explained hereinafter, the entire filter assembly 16 is removable, as a unit, from the tank 12. To facilitate the removal of the filter assembly, a pair of rods 110 are welded to tube sheet 82 adjacent central opening 92 (FIG. 2). A ring 112 is welded to the tops of rods 110. When it is desired to remove the filter assembly 16, cover 14 of tank 12 is rotated 180° from the position shown in FIG. 2, and a hook is placed in ring 112. The hook is in turn secured on a cable, which is in turn controlled by a hoisting mechanism. Since the ring is centrally located on the filter assembly 16, the hoisting of the filter assembly through the use of the ring will permit the assembly to move vertically upward, without tilting. When the filter assembly is replaced in the tank 12, it is merely lowered into place. To facilitate the centering of the filter assembly in the tank, centering nibs 114 (FIGS. 2 and 3) are formed on skirt 86. These nibs are made of a smooth plastic, such as polyvinyl chloride or nylon, and permit the smooth lowering of the filter assembly into the tank.

The operation of the filter of this invention will now be described with reference to FIG. 2. The fluid to be filtered, which may be for example, sea water, enters pipe 72 in the direction of arrows 116. The incoming fluid passes through a pipe or hose which is connected to pipe 72 through the use of flange 76, in a manner well known to the art. The fluid is under pressure, and passes upwardly through pipe 72 and through opening 92 formed by skirt 88. The fluid will fill the entire tank 12. The upper gasket 20 prevents any leakage from the top of the tank.

After the tank 12 has been filled, the fluid will pass through the filter cartridges 102, as indicated by arrows 118. The contaminants to be filtered out will remain on the cartridges, and the filtrate will enter the openings in the core 98, as indicated by arrows 120. The filtrate will then pass downwardly in cores 98 and through the bores of centering posts 100, as indicated by arrow 122.

At this point, it should be noted that the centering posts 100 are formed from a plastic, and are secured in the tube sheet 82 by a pressed fit. However, any of the filter tube connections known to the art can be used for securing the filter cores in place, such as welded connections or threaded connections.

After the filtrate has exited from the centering posts 100, it will enter the plenum chamber 90. Since the plenum chamber is annular, the entire chamber is in fluid communication with the opening in which the pipe 78 is welded. Accordingly, the filtrate will enter the pipe 78, in the direction of arrow 124. The filtrate leaves the pipe 78 in the direction of arrow 126. A suitable pipe is secured on pipe 78 through the use of flange 80. The filtrate can thus be transported through the secured pipe to its ultimate destination.

Periodically, the filter cartridges 102 will become sufficiently contaminated to prevent continued efficient filtration. At this point, the cartridges must be replaced. In order to replace the cartridges, the pumping of contaminated fluid is ceased. The tank 12 is then drained. Bolts 38 are then loosened and removed from their associated slots 24 in the manner described with respect to FIG. 4. Crank 58 is then actuated, and the cover is rotated 180° from the position shown in FIG. 2, as explained above. This completely exposes the interior of tank 12 and filter assembly 16.

The filter assembly 16 is then lifted vertically from the tank 12 through the use of a hoist, a hook and the loop 112, as explained above. When the filter assembly has been removed, all of the cartridges are easily removed from their associated cores 98, and new cartridges are placed on the cores. The assembly is then returned to the tank 12, with the sockets 104 and associated springs 108 in place. The cover is then returned to the position shown in FIG. 2, the bolts 38 ae tightened and the filter system is again ready for use.

One of the advantages of the cover removal assembly of this invention is the fact that as the cover is lowered in place, it will move solely vertically in view of the engagement of bar 64 in slot or gap 54. This ensures that the springs 108 will not be canted as the cover is replaced, and will thus ensure proper spring pressure from all of the springs. If the cover had to be rotated into its proper alignment after being lowered by a hoist, as is done in the prior art devices, it is possible to cant the springs, and possibly cause one or more of the springs to malfunction. If this occurred, there would not be a proper fluid-tight seal between the stacked cartridges, and leakage might occur, thereby permitting contaminants to pass through the filter system.

One of the advantages of the open-bottom plenum chamber of the filter assembly 16 is that no special care need be taken in aligning the filter assembly when it is replaced in the tank. Thus, the filter assembly will be self seating as it is lowered into place, and no precautions need be made to align openings or to ensure proper gasketing. Since the plenum chamber 90 is annular, it will automatically be in fluid communication with the outlet pipe 78 as soon as it is lowered in place. The gaskets 94 and 96, in combination with the pressure of springs 108, will always ensure a fluid-tight seal for the plenum chamber.

Another advantage of the filter assembly 16 is that once the filter assembly is removed, the entire interior of the tank is exposed. This permits complete cleaning of the tank, which is critical when potable liquids are being filtered. Furthermore, having the entire interior of the tank exposed permits the coating of all exposed parts of the tank, where coating is necessary. Thus, when filtering sea water, as explained above, the entire tank and its inlet and outlet pipes must be coated with a corrosion resistant material, such as an epoxy resin. With the entire interior of the tank exposed after the filter assembly 16 has been removed, or prior to the initial insertion of the filter assembly, all elements of the tank can be welded, ground and surface-prepared prior to coating. Thereafter, the coating can be sprayed on all exposed surfaces. The pipes 72 and 78 can also easily be coated by inserting spraynozzles into the tops and bottoms of the pipes.

Similarly, all of the exposed parts of the filter assembly 16 can be coated. Where the parts are formed from plastic, coating is unnecessary. However, the metallic parts, such as the tube sheet 82 and its associated lips are easily coated with the filter assembly out of the tank 12.

As explained above, prior to this invention, complete filter systems could only be coated with great difficulty and at great expense. Where there was a permanent tube sheet, the plenum chamber beneath the tube sheet could only be coated by providing a manway. It is impossible to provide a manway in small filters, since there is not sufficient space for one. Normally, in the small filters, the tube sheet is secured in place between the upper part of the tank and the plenum chamber by providing a tube sheet which is releasably secured between annular flanges on the tank. The cost of the metal in providing the flanges and the labor involved in providing the flanges greatly increase the cost of the tank. Furthermore, whenever it was desired to clean the system, the tank had to be completely disassembled and the tube sheet removed, which is obviously quite time consuming and expensive. All of these problems are obviated by the system of this invention.

For the purpose of clarity, the resin coating on all of the elements of the filter system which come in contact with the fluid to be filtered has not been shown. Thus, the use of the resin coating is an optional feature which will be used only when certain highly corrosive materials, such as sea water or chemicals, are being filtered. In many applications, the coating is unnecessary. However, solely for the purpose of illustration, a resin coating on the interior of tank 12 has been shown at 128 in FIG. 4. It should be understood that all elements of the filter system which come in contact with the fluid to be filtered will have a similar coating. However, as explained above, the coating has not been shown on all other elements, solely for the purpose of clarity.

Figure 6:
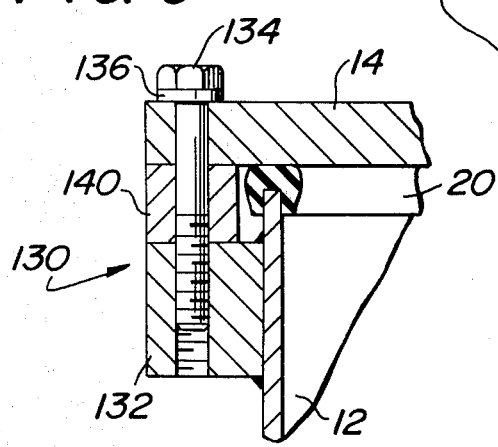
FIG. 6 is a sectional view of a modified embodiment of a bolt assembly for securing the cover of the filter tank in place; and, FIG. 7 is a schematic view showing the use of the filter of this system in a series and parallel connection.

A modified bolt assembly is generaly shown at 130 in FIG. 6. The modified bolt assembly functions in the same manner as bolt assembly 26 to the extent that it ensures proper compression of gasket 20. Thus, it ensures that the gasket will be sufficiently compressed to prevent fluid leakage, while at the same time it will not be compressed to so great an extent that the gasket will be torn or sheared by the top edge of the tank 12. In the embodiment of the bolt assembly shown at 130, a plurality of internally threaded blocks 132 are secured on the outer wall of tank 12. The number of blocks 132 and their spacing are identical to the number and spacing of bolt assemblies 26 (FIG. 1). Cover 14 is provided with an opening overlying each block 132. The openings in the cover replace the slots 24 shown in FIG. 1. A bolt 134 passes through each opening in the cover 14, and is threadedly received in block 132. Washers 136 are associated with bolt 134.

In order to limit the pressure of cover 14 on gasket 20, a spacer 140 is positioned between cover 14 and block 132. Accordingly, in use, bolt 134 is tightened until cover 14 firmly abuts the spacer 140. Thus, spacers 140 act as stops to limit the amount of tightening of the bolts 134.

When it is desired to remove the cover 14, all of the bolts 134 are removed. Thereafter, the cover 14 is raised and rotated in the manner described above. When the cover is returned to the position overlying the tank, all of the bolts 114 are replaced and tightened in place. If desired, the spacers 140 can be welded in place to facilitate the reassembly of the cover in place.

One of the advantages of the bolt assembly 130 is that the entire assembly can be prepared and secured in place with a minimum of materials and labor. In prior art filters, the covers are held in place by large annular flanges that project around the entire circumference of the tank 12. Using the assembly 130, it is not necessary to provide all of the steel necessary for an entire flange. Furthermore, the machining necessary is extensively reduced by providing the simple blocks, instead of providing the annular flange. The blocks 132 have all of the structural advantages of the prior art flanges.

Bolt assemblies 26 and 130 both possess the unique feature of providing a positive limit for the tightening of their associated bolts. Thus, there is metal-to-metal contact between the cover 14 and the supporting structure when the bolts are tightened. This gives a positive limit to the amount of pressure that will be placed on the gasket 20. This, in turn, ensures that a fluid-tight seal will be made, while at the same time ensuring that the gasket will not be damaged by overtightening of the bolts.

Figure 7:
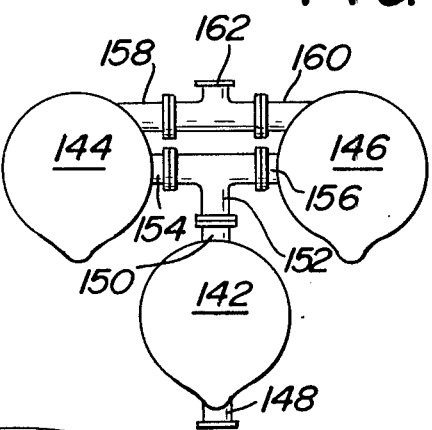

One of the features of this invention is the provision of the inlet pipe 72 and the outlet pipe 78 on the bottom of the tank 12. This facilitates connecting a group of filter assemblies 10 in series and parallel connections. One such arrangement is schematically shown in FIG. 7. Filter systems 142, 144 and 146 are shown schematically therein. Each of these filter systems is identical in structure and function to filter system 10 described above.

Having the inlet and outlet pipes on the bottom of the tank permits total flexibility in arranging the angles of the pipes relative to the tanks. In FIG. 7, a multiple filtration process is schematically shown. More particularly, a fluid to be filtered enters tanks 142 through pipe 148. The fluid is filtered in the manner described above, and the filtrate exits the tank 142 through pipe 150. The filtrate then enters a T-connection 152, with one half of the filtrate entering filter 144 through pipe 154 and the other half of the filtrate entering filter 146 through pipe 156.

The fluid is then refiltered in filters 144 and 146, and the filtrate from these filters exits through pipes 158 and 160, respectively. The filtrate from the two filters 144 and 146 is then combined in T-connection 162, from which it is collected for re-use.

The complete system shown in FIG. 7 is merely examplary of the types of systems that can be formed from the filter of this invention. Obviously, additional filters can be added or other configurations can be used. Having the bottom inlet and outlet pipes and the flexibility in connection with the angles of the pipes relative to their respective tanks permits unlimited configurations for the use of the filter of this invention.

Without further elaboration, the foregoing will so fully illustrate my invention, that others may, by applying current or future knowledge, adopt the same for use under various conditions of service.

What is claimed as the invention is:

1. A filter comprising a tank and a filter assembly removably mounted in said tank, said filter assembly comprising a tube sheet, filter means secured on said tube sheet, said tube sheet having a peripheral skirt projecting downwardly therefrom, gasket means secured on the bottom of said peripheral skirt, said gasket means being in contact with the bottom of said filter tank, whereby a plenum chamber is formed by said tube sheet, peripheral skirt and bottom, spring means for urging said gasket means against said bottom to form a fluid-tight seal between said plenum chamber and said bottom, said plenum chamber being in fluid communication with said filter means, whereby the filtrate passing through said filter means enters said plenum chamber, and outlet means for said filtrate in fluid communication with said plenum chamber.

2. The filter of claim 1 wherein said filter means comprises a plurality of filter tubes secured in said tube sheet.

3. The filter of claim 2 wherein each of said filter tubes comprises a core and at least one replaceable filter cartridge over said core.

4. The filter of claim 3 wherein a plurality of filter cartridges are vertically stacked on each of said cores.

5. The filter of claim 1 wherein said spring means comprise a plurality of compression springs, said tank further including a cover thereon, and said compression springs being compressed by said cover.

6. The filter of claim 1 wherein said filter means comprises a plurality of filter tubes secured in said tube sheet, each of said filter tubes having a plurality of filter cartridges stacked thereon, and said spring means serving to bring vertical pressure against said stacked cartridges at the same time that they bring pressure against said gasket means.

7. The filter of claim 1 wherein said gasket means are U-shaped, with the legs of said gasket means resiliently engaging the wall of said skirt.

8. The filter of claim 1, and further including means for removing said filter assembly from said tank.

9. The filter of claim 8 wherein said removing means comprises a pair of rods secured to said tube sheet, and means on said rods for receiving hook means to lift said filter assembly from said tank.

10. The filter of claim 1, and further including a cover on said tank.

11. The filter of claim 10, and further including means for releasably securing said cover on said tank.

12. The filter of claim 11 wherein said releasably securing means comprise a plurality of bolts.

13. The filter of claim 12, and further including threaded means on said tank, with each of said bolts passing through said cover and being threadedly received in said threaded means.

14. The filter of claim 13 wherein said threaded means are rotatably mounted on said tank, said cover having an inwardly projecting slot for each of said bolts, with the heads of said bolts being supported above said slots, and said bolts being rotatable away from said cover around said rotatable threaded means.

15. The filter of claim 13 wherein said threaded means comprise blocks secured on the exterior of said tank.

16. The filter of claim 10 wherein said tank includes an upper edge, gasket means on said upper edge, and said cover providing a fluid-tight seal with said tank gasket means when said cover is secured on said tank.

17. The filter of claim 16 wherein said tank gasket means is U-shaped, with the legs of said gasket means resiliently engaging the wall of said tank.

18. The filter of claim 10, and further including means for rotatably mounting said cover on said tank, whereby said cover can be rotated to fully expose the interior of said tank, while still being supported by said tank.

19. The filter of claim 18, and further including means on said tank for lifting said cover relative to said tank, and prior to rotation of said cover relative to said tank.

20. The filter of claim 19 wherein said lifting means comprises a screwjack.

21. The filter of claim 19 wherein said lifting means is also adapted to lower said cover, and further including aligning means for aligning said cover with the top of said tank when said cover is lowered.

22. The filter of claim 1 wherein said filter means comprises a plurality of filter tubes secured in said tube sheet, each of said filter tubes comprising a core and a plurality of replaceable filter cartridges stacked over said core, with the interior of said core being in fluid communication with said plenum chamber, said spring means for urging said gasket means against said bottom to form a fluid-tight seal between said plenum chamber and said bottom comprising spring means associated with each of said filter tubes, a cover on said tank, said cover bearing against said spring means, and said spring means serving to bring pressure against said aligned filter cartridges and said gasket means.

23. The filter of claim 22 wherein said tank has an upper peripheral edge, gasket means on said edge, said tank gasket means being U-shaped, with the legs of said gasket means resiliently engaging the wall of said tank, and said cover abutting said tank gasket means to form a fluid-tight seal with said tank.

24. A filter comprising a tank and a filter assembly removably mounted in said tank, said filter assembly comprising a tube sheet, filter means secured on said tube sheet, said tube sheet having a peripheral skirt projecting downwardly therefrom, gasket means at the bottom of said peripheral skirt, said gasket means being in contact with the bottom of said filter tank, whereby a plenum chamber is formed by said tube sheet, peripheral skirt and bottom, said tube sheet having a second dependent skirt, said peripheral skirt and said dependent skirt being unitary with said tube sheet, said skirts being spaced, and serving as vertical walls for said plenum chamber, gasket means on said second dependent skirt, said plenum chamber being in fluid communication with said filter means, whereby the filtrate passing through said filter means enters said plenum chamber, and outlet means for said filtrate in fluid communication with said plenum chamber.

25. The filter of claim 8 wherein said skirts are circular and concentric.

26. The filter of claim 24 wherein said tube sheet has an opening formed at said second dependent skirt, with said dependent skirt defining a wall of said opening, said tank bottom having an opening therein, said bottom opening being in fluid communication with the opening in said tube sheet, and means for delivering fluid to be filtered through said openings.

27. The filter of claim 24 wherein the gasket means on each of said skirts are U-shaped, with the legs of each of the U's resiliently engaging the walls of the skirts.

28. A filter comprising a tank and a filter assembly removably mounted in said tank, said filter assembly comprising a tube sheet, filter means secured on said tube sheet, said tube sheet having a peripheral skirt projecting downwardly therefrom, gasket means at the bottom of said peripheral skirt, said gasket means being in contact with the bottom of said filter tank, whereby a plenum chamber is formed by said tube sheet, peripheral skirt and bottom, said plenum chamber being in fluid communication with said filter means, whereby the filtrate passing through said filter means enters said plenum chamber, a cover on said tank, means for rotatably mounting said cover on said tank, whereby said cover can be rotated to fully expose the interior of said tank, while still being supported by said tank, means on said tank for lifting said cover relative to said tank, and prior to rotation of said cover relative to said tank, said lifting means being adapted to lower said cover, aligning means for aligning said cover with the top of said tank when said tank is lowered, said aligning means comprising a bar associated with said cover and a slot adapted to receive said bar, said slot being adapted to prevent any substantial rotational movement of said cover when said bar is received in said slot, and outlet means for said filtrate in fluid communication with said plenum chamber.

29. A filter comprising a tank and filter means within said tank, inlet means associated with said tank to bring a fluid to be filtered into said tank, outlet means associated with said tank to remove the filtrate, said tank having an upper edge, gasket means on said upper edge, said gasket means being U-shaped, with the legs thereof resiliently engaging the wall of said tank, a cover on said tank, said cover contacting said gasket means and providing a fluid-tight seal with said tank, means for releasably securing said cover on said tank, said releasably securing means comprising a plurality of bolts, and stop means for limiting the amount of tightening of said bolts, whereby the maximum amount of tightening of said bolts will provide a fluid-tight seal between said cover and said gasket means, while at the same time preventing any shearing of said gasket means.

30. The filter of claim 29, and further including threaded means on said tank, with each of said bolts passing through said cover and being threadedly received in said threaded means.

31. The filter of claim 30 wherein said threaded means are rotatably mounted on said tank, said cover having an inwardly projecting slot for each of said bolts, with the heads of said bolts being supported above said slots, and said bolts being rotatable away from said cover and around said rotatable threaded means.

32. The filter of claim 30 wherein said threaded means comprise blocks secured on the exterior of said tank.

33. The filter of claim 29 wherein said limiting means comprise stops on said tank which abut the underside of said cover when said bolts are tightened.

34. A filter comprising a tank and filter means within said tank, inlet means associated with said tank to bring a fluid to be filtered into said tank, outlet means associated with said tank to remove the filtrate, a cover on said tank, means on said tank for raising and lowering said cover relative to said tank, said cover being rotatable about said raising and lowering means, and aligning means for aligning said cover with the top of said tank when said cover is lowered, said aligning means comprising a bar said cover is lowered, said aligning means comprising a bar associated with said cover and a slot adapted to receive said bar, said slot being adapted to prevent any substantial rotational movement of said cover when said bar is received in said slot.

35. The filter of claim 34 wherein said raising and lowering means comprises a screwjack.

36. The filter of claim 34 wherein said raising and lowering means includes a vertically movable cylinder, a sleeve rotatably mounted on said cylinder, and said cover being secured on said sleeve, whereby said cover may be rotated about said cylinder.

37. A filter assembly for use in a tank comprising a tube sheet, filter means secured on said tube sheet, said tube sheet having a peripheral skirt projecting downwardly therefrom, said tube sheet having a second dependent skirt, said peripheral skirt and said dependent skirt being unitary with said tube sheet, said skirts being spaced, and serving as vertical walls with said tube sheet to form a plenum chamber, and gasket means on said peripheral skirt and said dependent skirt.

38. The filter assembly of claim 37 wherein said gasket means is U-shaped, with the legs of said gasket means resiliently engaging the wall of said peripheral skirt.

39. The filter assembly of claim 37 wherein said filter means comprises a plurality of filter tubes secured in said tube sheet.

40. The filter assembly of claim 39 wherein each of said filter tubes comprises a core and at least one replaceable filter cartridge over said core.

41. The filter assembly of claim 40 wherein a plurality of filter cartridges are vertically stacked on each of said cores.

42. The filter assembly of claim 37 wherein said skirts are circular and concentric.

43. The filter assembly of claim 37 wherein said gasket means on each of said skirts are U-shaped, with the legs of each of said gasket means resiliently engaging the walls of the skirts.

* * * * *